(12) United States Patent
Terai (10) Patent No.: US 11,611,216 B2
(45) Date of Patent: Mar. 21, 2023

(54) DISTRIBUTED POWER SUPPLY SYSTEM, CONTROL APPARATUS AND DISTRIBUTED POWER SUPPLY CONTROL METHOD

(71) Applicant: KYOCERA Corporation, Kyoto (JP)

(72) Inventor: Ryota Terai, Yokohama (JP)

(73) Assignee: KYOCERA CORPORATION, Kyoto (JP)

(*) Notice: Subject to any disclaimer, the term of this patent is extended or adjusted under 35 U.S.C. 154(b) by 121 days.

(21) Appl. No.: 17/263,547

(22) PCT Filed: Jul. 19, 2019

(86) PCT No.: PCT/JP2019/028442
§ 371 (c)(1),
(2) Date: Jan. 27, 2021

(87) PCT Pub. No.: WO2020/022210
PCT Pub. Date: Jan. 30, 2020

(65) Prior Publication Data
US 2021/0249866 A1    Aug. 12, 2021

(30) Foreign Application Priority Data
Jul. 27, 2018   (JP) .............................. JP2018-140935

(51) Int. Cl.
*H02J 3/38* (2006.01)
*H02J 13/00* (2006.01)
*G05B 15/02* (2006.01)

(52) U.S. Cl.
CPC .............. *H02J 3/381* (2013.01); *G05B 15/02* (2013.01); *H02J 13/00006* (2020.01); *H02J 2300/30* (2020.01)

(58) Field of Classification Search
CPC .. H02J 3/381; H02J 13/00006; H02J 2300/30; H02J 3/144; H02J 13/00002; H02J 13/00004; G05B 15/02; Y02B 70/3225; Y02E 60/00; Y04S 10/30; Y04S 20/222; Y04S 40/12
See application file for complete search history.

(56) References Cited

U.S. PATENT DOCUMENTS

| 9,099,868 B2 | 8/2015 | Taft | |
| 11,291,510 B2* | 4/2022 | Shelton, IV | ........... A61B 34/37 |
| 11,392,116 B2* | 7/2022 | Cella | .................. G05B 23/0221 |

(Continued)

FOREIGN PATENT DOCUMENTS

| JP | 2005182399 A | 7/2005 |
| JP | 2006180697 A | 7/2006 |
| WO | 2018043662 A1 | 3/2018 |

*Primary Examiner* — Ramesh B Patel
(74) *Attorney, Agent, or Firm* — Hauptman Ham, LLP (57) ABSTRACT

The distributed power supply system includes: a communicator configured to receive a first message from a power management server configured to control the distributed power supply and receive a second message from an equipment management server configured to monitor the distributed power supply; and a controller configured to control the distributed power supply based on the first message and the second message. If the first message and the second message conflict with each other, the controller controls the distributed power supply based on the second message preferentially over the first message.

20 Claims, 6 Drawing Sheets

(56) References Cited

U.S. PATENT DOCUMENTS

| | | | |
|---|---|---|---|
| 2005/0034023 A1* | 2/2005 | Maturana | G05B 15/02 714/37 |
| 2006/0071776 A1* | 4/2006 | White, II | H02J 13/00002 340/538 |
| 2009/0062970 A1* | 3/2009 | Forbes, Jr. | G06Q 50/06 700/295 |
| 2013/0090773 A1 | 4/2013 | Park et al. | |
| 2013/0234523 A1 | 9/2013 | Anichkov et al. | |
| 2014/0018969 A1* | 1/2014 | Forbes, Jr. | H02J 3/386 700/295 |
| 2014/0277788 A1* | 9/2014 | Forbes, Jr. | H02J 13/00017 700/286 |
| 2015/0185748 A1* | 7/2015 | Ishchenko | G05F 1/66 700/292 |
| 2017/0102726 A1* | 4/2017 | Goldsmith | H02J 13/00 |
| 2018/0316188 A1* | 11/2018 | Ishchenko | H02J 3/06 |
| 2019/0199131 A1 | 6/2019 | Nakamura | |
| 2020/0387982 A1* | 12/2020 | Nakagaki | H02J 3/32 |
| 2021/0083505 A1* | 3/2021 | Beaston | H02J 3/381 |

* cited by examiner

```
<ns2:eventDescriptor>
    <ns2:eventID>***</ns2:eventID>
    <ns2:modificationNumber>0</ns2:modificationNumber>
    <ns2:modificationDateTime>2016-11-08T01:20:02Z</ns2:modificationDateTime>
    <ns2:priority>100</ns2:priority>
    <ns2:eiMarketContext>
        <ns4:marketContext>***DR</ns4:marketContext>
    </ns2:eiMarketContext>
    <ns2:createdDateTime>2016-11-08T01:20:17Z</ns2:createdDateTime>
    <ns2:eventStatus>far</ns2:eventStatus>
    <ns2:testEvent>false</ns2:testEvent>
    <ns2:vtnComment></ns2:vtnComment>
</ns2:eventDescriptor>
```

FIG. 6

```
<ns2:eventDescriptor>
    <ns2:eventID>***</ns2:eventID>
    <ns2:modificationNumber>0</ns2:modificationNumber>
    <ns2:modificationDateTime>2016-11-08T01:20:02Z</ns2:modificationDateTime>
    <ns2:priority>1</ns2:priority>
    <ns2:eiMarketContext>
        <ns4:marketContext>***Maintenance</ns4:marketContext>
    </ns2:eiMarketContext>
    <ns2:createdDateTime>2016-11-08T01:20:17Z</ns2:createdDateTime>
    <ns2:eventStatus>far</ns2:eventStatus>
    <ns2:testEvent>false</ns2:testEvent>
    <ns2:vtnComment></ns2:vtnComment>
</ns2:eventDescriptor>
```

DISTRIBUTED POWER SUPPLY SYSTEM, CONTROL APPARATUS AND DISTRIBUTED POWER SUPPLY CONTROL METHOD

RELATED APPLICATIONS

The present application is a National Phase of International Application No. PCT/JP2019/028442, filed Jul. 19, 2019, and claims priority based on Japanese Patent Application No. 2018-140935, filed Jul. 27, 2018.

TECHNICAL FIELD

The present invention relates to a distributed power supply system, a control apparatus and a distributed power supply control method.

BACKGROUND ART

In recent years, techniques that use a power storage apparatus as a distributed power supply in order to maintain a power supply-demand balance of a power grid (for example, a virtual power plant (VPP)) have been known (for example, Patent Literature 1). Furthermore, use of a fuel cell system as a distributed power supply used in, e.g., a VPP is possible.

CITATION LIST

Patent Literature

Patent Literature 1: Japanese application publication No. 2005-182399

SUMMARY OF INVENTION

A distributed power supply system according to a first feature includes a distributed power supply. The distributed power supply system includes: a communicator configured to receive a first message from a power management server configured to control the distributed power supply and receive a second message from an equipment management server configured to monitor the distributed power supply; and a controller configured to control the distributed power supply based on the first message and the second message. If the first message and the second message conflict with each other, the controller controls the distributed power supply based on the second message preferentially over the first message.

A control apparatus according to a second feature includes: a communicator configured to receive a first message from a power management server configured to control a distributed power supply and receive a second message from an equipment management server configured to monitor the distributed power supply; and a controller configured to control the distributed power supply based on the first message and the second message. If the first message and the second message conflict with each other, the controller controls the distributed power supply based on the second message preferentially over the first message.

A distributed power supply control method according to a third feature includes: receiving a first message from a power management server configured to control a distributed power supply; receiving a second message from an equipment management server configured to monitor the distributed power supply; and controlling the distributed power supply based on the first message and the second message. The controlling the distributed power supply includes controlling the distributed power supply based on the second message preferentially over the first message if the first message and the second message conflict with each other.

DESCRIPTION OF EMBODIMENT

A case where a power management server that controls a distributed power supply in order to maintain a power supply-demand balance of a power grid and an equipment management server that monitors the distributed power supply in order to perform maintenance on the distributed power supply belong to entities that are different from each other is conceivable.

As a result of a diligent study, the inventors found that in such case, if a message transmitted from the equipment management server and a message transmitted from the power management server conflict with each other, such conflict of messages may hinder proper control of the distributed power supply.

Therefore, the present disclosure is intended to solve the aforementioned problem and enables properly control of a distributed power supply.

A distributed power supply system according to an embodiment includes a distributed power supply. The distributed power supply system includes: a communicator configured to receive a first message from a power management server configured to control the distributed power supply and receive a second message from an equipment management server configured to monitor the distributed power supply; and a controller configured to control the distributed power supply based on the first message and the second message. If the first message and the second message conflict with each other, the controller controls the distributed power supply based on the second message preferentially over the first message.

An embodiment will be described below with reference to the drawings. Note that in the below descriptions of the drawings, identical or similar parts are provided with identical or similar reference numerals.

In this regard, it should be born in mind that the drawings are schematic, and a ratio of each dimension is different from actual one. Therefore, each specific dimension needs to be decided in view of the following description. Of course, the drawings naturally includes portions having different dimensional relationships or ratios.

Embodiment (Power System)

A power system according to an embodiment will be described below.

Figure 1:
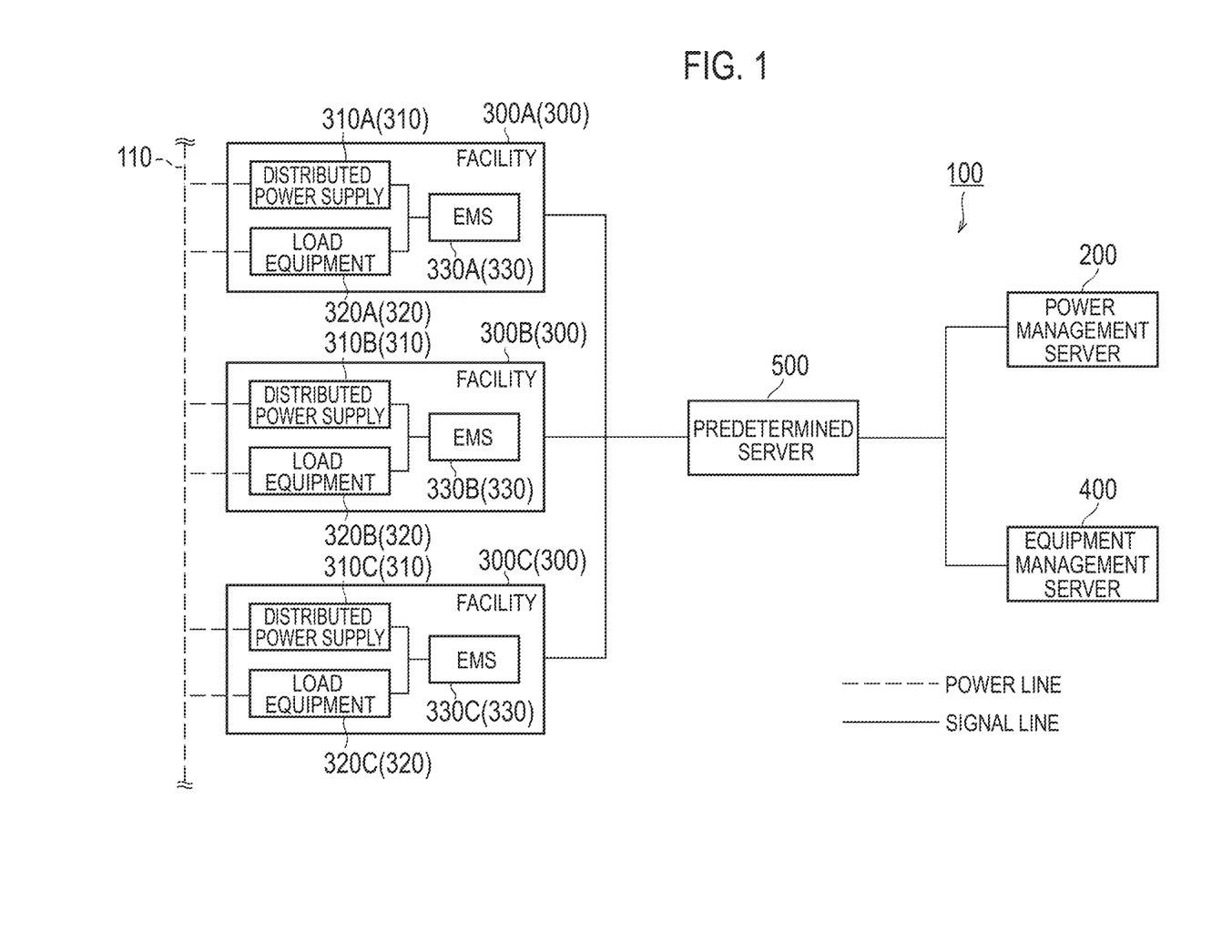
FIG. 1 is a diagram illustrating a power system 100 according to an embodiment.

As illustrated in FIG. 1, a power system 100 includes a power management server 200, facilities 300, an equipment management server 400 and a predetermined server 500. In FIG. 1, as the facilities 300, facilities 300A to 300C are illustrated.

Each facility 300 is connected to a power grid 110. Hereinafter, a flow of power from the power grid 110 to the facility 300 will be referred to as a power flow, and a flow of power from the facility 300 to the power grid 110 will be referred to as a reverse power flow.

The power management server 200 is a server that controls distributed power supplies (for example, later-described distributed power supplies 310). The power management server 200 transmits a first message that provides an instruction on control of a distributed power supply 310 provided in a facility 300 to an EMS 330 provided in the facility 300. For example, the power management server 200 may transmit a power flow control message (for example, demand response (DR)) that demands control of a power flow or may transmit a reverse power flow control message that demands control of a reverse power flow. Furthermore, the power management server 200 may transmit a power supply control message for controlling an operating state of a distributed power supply. A degree of control of a power flow or a reverse power flow may be expressed by an absolute value (for example, xx kW) or may be expressed by a relative value (for example, xx %). Alternatively, the degree of control of a power flow or a reverse power flow may be expressed in two or more levels. The degree of control of a power flow or a reverse power flow may be expressed by a power rate determined by a current power supply-demand balance (real time pricing (RTP)) or may be expressed by a power rate determined by a past power supply-demand balance (time of use (TOU)).

For example, the power management server 200 is managed by power companies such as a power generation company, a power distribution company and a retail company. The first message is a message for the power companies to adjust a power supply-demand balance of the power grid 110.

Each facility 300 includes a distributed power supply 310, load equipment 320 and an EMS 330.

The distributed power supply 310 may be a fuel cell apparatus that generates power using a fuel. The fuel cell apparatus is an apparatus that generates power using a fuel. For example, the fuel cell apparatus may be at least one of a solid oxide fuel cell (SOFC), a polymer electrolyte fuel cell (PEFC), a phosphoric acid fuel cell (PAFC) and a molten carbonate fuel cell (MCFC). The distributed power supply 310 may be an apparatus that generates power using at least one of natural energies such as sunlight, wind power, water power and ground heat. The distributed power supply 310 may be a power storage apparatus that performs power charge and power discharge.

The load equipment 320 is equipment that consumes power. For example, the load equipment 320 is at least one of air-conditioning equipment, lighting equipment and audio visual (AV) equipment.

The EMS 330 is an apparatus (energy management system (EMS)) that manages power in the facility 300. The EMS 330 corresponds to a control apparatus. The EMS 330 may control operating states of the distributed power supply 310 and the load equipment 320. The EMS 330 is an example of a virtual end node (VEN).

The equipment management server 400 is a server that monitors distributed power supplies (for example, the above-described distributed power supplies 310). The equipment management server 400 transmits a second message for performing maintenance of the distributed power supply 310 provided in a facility 300 to the EMS 330 provided in the facility 300. For example, the maintenance includes, e.g., an inspection for inspecting a deterioration status of the facility, maintenance in which minor care is taken during an inspection, a repair for dealing with a defect of the facility and replacement of existing equipment with new equipment. Note that the maintenance may be performed during stoppage of the distributed power supply 310 or may be performed during operation of the distributed power supply 310.

For example, the equipment management server 400 is managed by equipment suppliers such as a manufacturer, a distributor, and a maintenance provider of the distributed power supplies 310.

The predetermined server 500 is a server that relays a first message and a second message. The predetermined server 500 may transmit a first message for a facility 300 managed by the predetermined server 500, based on a first message for the facility 300 managed by the power management server 200. The predetermined server 500 may relay a second message transparently.

For example, the predetermined server 500 is managed by a resource aggregator. The resource aggregator is a power company that provides power in a reverse power flow to, e.g., a power generation company, a power distribution company and a retail company, in a virtual power plant (VPP). The resource aggregator may be a power company that generates surplus power (negawatts) by reduction of power consumed by facilities managed by the resource aggregator. Such surplus power may be regarded as generated power. The resource aggregator may be a power company that absorbs extra power by means of an increase of power consumed by a facility managed by the resource aggregator (for example, an increase in amount of charge in a storage battery apparatus).

In the embodiment, communication between the power management server 200 and the predetermined server 500, communication between the equipment management server 400 and the predetermined server 500 and communication between the predetermined server 500 and the EMSs 330 may be performed according to a first protocol. On the other hand, communication between each EMS 330 and the relevant distributed power supply 310 and communication between each EMS 330 and the relevant load equipment 320 may be performed according to a second protocol that is different from the first protocol. For example, for the first protocol, a protocol that complies with Open Automated Demand Response (ADR) 2.0 or a unique dedicated protocol can be used. For example, for the second protocol, a protocol that complies with ECHONET Lite, Smart Energy Profile (SEP) 2.0, KNX or a unique dedicated protocol can be used. The first protocol and the second protocol only need to be different from each other, and, for example, even if the first protocol and the second protocol are both unique dedicated protocols, the unique dedicated protocols only need to be protocols created according to different rules.

(Power Management Server)

Figure 2:
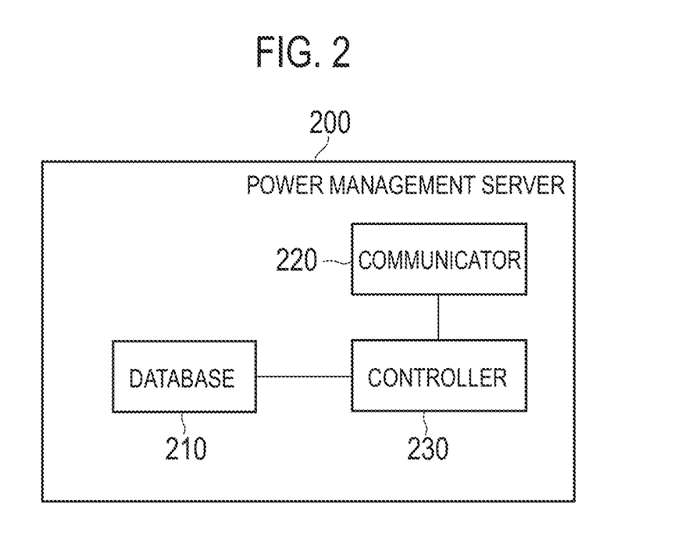
FIG. 2 is a diagram illustrating a power management server 200 according to the embodiment.

A power management server according to the embodiment will be described below. As illustrated in FIG. 2, the power management server 200 includes a database 210, a communicator 220 and a controller 230. The power management server 200 is an example of a virtual top node (VTN).

The database 210 includes a storage medium such as a non-volatile memory or/and a hard disk drive (HDD) and stores data relating to the facilities 300 managed by the power management server 200. Each of the facilities 300 managed by the power management server 200 may be a facility 300 that contracts with a power company. For example, the data relating to the facilities 300 may be demand power supplied from the power grid 110 to the facilities 300. The data relating to the facilities 300 may be at least one of, e.g., a type of the distributed power supply 310 provided in each facility 300 and a specification of the distributed power supply 310 provided in each facility 300. The specification may be, e.g., a rated generated power (W) and a maximum power output (W) of the distributed power supply 310.

The communicator 220 includes a communication module and performs communication with the EMSs 330 via the predetermined server 500. As described above, the communicator 220 performs communication according to the first protocol.

The controller 230 includes a control circuit including, e.g., a memory and a central processing unit (CPU) and controls respective components provided in the power management server 200. For example, the controller 230 determines transmission of a first message from the perspective of the power supply-demand balance of the power grid 110. The first message may be any of messages in (a1) to (a7) below or a message that is a combination of two or more of the messages.

(a1) A message that provides an instruction to increase or decrease an output of the distributed power supply 310 in order to maintain the power supply-demand balance;

(a2) A message that provides an instruction to stop or start operation of the distributed power supply 310 in order to maintain the power supply-demand balance;

(a3) A message that designates a time for starting stoppage of operation of the distributed power supply 310 or a time for starting operation of the distributed power supply 310 in order to maintain the power supply-demand balance;

(a4) A message that designates a time or a duration during which maintenance of the power supply-demand balance is necessary;

(a5) A message that provides notification of an end of maintenance of the power supply-demand balance;

(a6) A message that provides an instruction to resume operation of the distributed power supply 310 along with an end of maintenance of the power supply-demand balance; and (a7) A message that urges a return to a normal mode along with an end of maintenance of the power supply-demand balance.

As described above, the first message may be at least one of a power flow control message, a reverse power flow control message and a power supply control message.

(Equipment Management Server)

Figure 3:
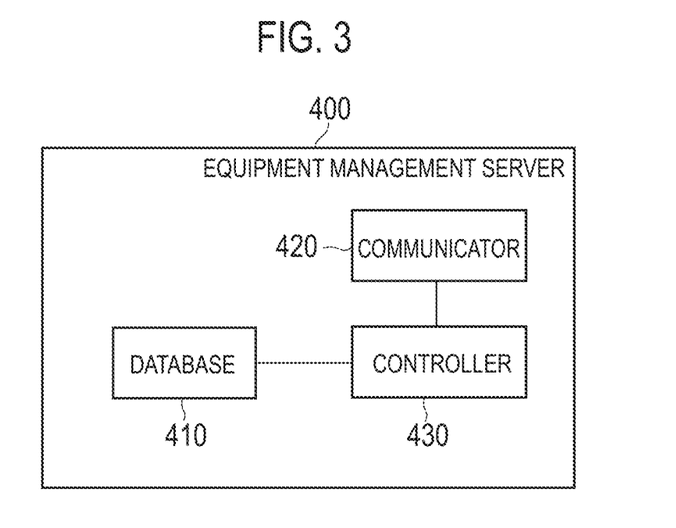
FIG. 3 is a diagram illustrating an equipment management server 400 according to the embodiment.

An equipment management server according to the embodiment will be described below. As illustrated in FIG. 3, the equipment management server 400 includes a database 410, a communicator 420 and a controller 430.

The database 410 includes a storage medium such as a non-volatile memory or/and an HDD and manages information relating to the plurality of facilities 300.

The database 410 may store basic information of the equipment provided in each of the plurality of facilities 300. The database 410 stores, for example, a facility name, a facility ID, an equipment name, an equipment ID, an installation year, an age and a useful life in association with one another. The facility name is a name of the facility 300 in which the relevant equipment is installed. The facility ID is an identifier that identifies the facility 300. The equipment name is a name of the equipment. The equipment ID is an identifier that identifies the equipment. The installation year is a year in which the equipment was installed. The age is the number of years passed since the installation of the equipment. The useful life, which is determined by, e.g., a manufacturer of the equipment, is information indicating a duration during which the equipment can properly be used since the installation of the equipment.

For the respective facilities 300, the database 410 may store maintenance information of the equipment provided in each of the plurality of facilities 300. The database 410 stores, for example, a facility name, an equipment name, a maintenance date, a maintenance overview and maintenance details in association with one another. The database 410 may store a facility ID and an equipment ID in association with these information pieces. The facility name and the equipment name are as described above. The maintenance date is a date on which maintenance was performed. The maintenance overview is information indicating an overview of the maintenance, and the maintenance details are information pieces indicating details of the maintenance. Maintenance information according to the embodiment only needs to include at least a maintenance term (schedule) for performing maintenance of equipment in the future. The maintenance information may include a maintenance term in which maintenance of the equipment was performed in the past.

The communicator 420 includes a communication module and performs communication with the EMSs 330 via the predetermined server 500. As described above, the communicator 420 performs communication according to the first protocol.

The controller 430 includes a control circuit including, e.g., a memory and a CPU and controls respective components provided in the equipment management server 400. For example, the controller 430 determines transmission of a second message from the perspective of maintenance of a distributed power supply 310. The second message may be any of messages in (b1) to (b6) below or a message that is a combination of two or more of the messages.

(b1) A message that provides an instruction to stop operation of the distributed power supply 310 in order to start maintenance;

(b2) A message that designates a time for starting stoppage of operation of the distributed power supply 310 in order to start maintenance;

(b3) A message that designates a time or a duration necessary for maintenance of the distributed power supply 310;

(b4) A message that provides notification of an end of maintenance of the distributed power supply 310;

(b5) A message that provides an instruction to resume operation of the distributed power supply 310 along with an end of maintenance of the distributed power supply 310; and (b6) A message that urges a return to a normal mode along with an end of maintenance of the distributed power supply 310.

(Distributed Power Supply System)

Figure 4:
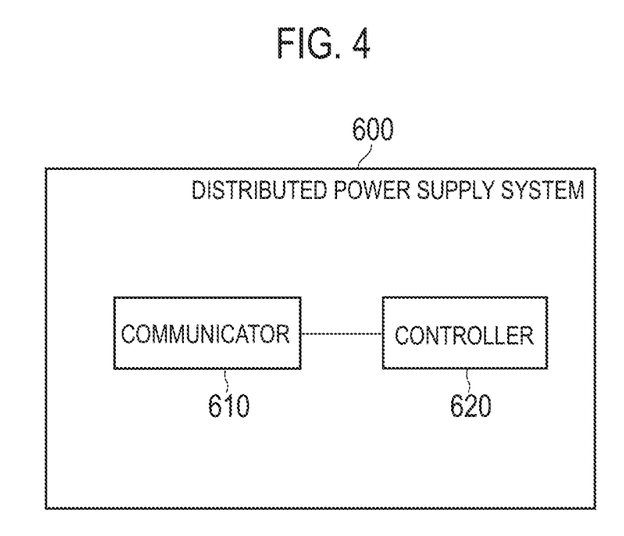
FIG. 4 is a diagram illustrating a distributed power supply system 600 according to the embodiment.

A distributed power supply system according to the embodiment will be described below. As illustrated in FIG. 4, a distributed power supply system 600 includes a communicator 610 and a controller 620. The distributed power supply system 600 only needs to be a system including the distributed power supplies 310. For example, the distributed power supply system 600 includes the distributed power supplies 310 and the EMSs 330. The distributed power supply system 600 may include the distributed power supplies 310 without including the EMSs 330.

The communicator 610 includes a communication module and performs communication with the power management server 200 and the equipment management server 400 via the predetermined server 500. In other words, the communicator 610 receives a first message from the power management server 200 and receives a second message from the equipment management server 400.

The controller 620 includes a control circuit including, e.g., a memory and a CPU and controls respective components provided in the distributed power supply system 600. For example, the controller 620 controls each distributed power supply 310 based on a first message and a second message.

In the embodiment, if a first message and a second message conflict with each other, the controller 620 controls the relevant distributed power supply 310 based on the second message preferentially over the first message. As a conflict between a first message and a second message, a case of controlling a distributed power supply 310 based on a second message for a time slot in which the distributed power supply 310 is controlled based on a first message is conceivable. For example, a case of an instruction to stop a distributed power supply 310 being provided based on a second message in a time slot in which an instruction to increase or decrease an output of the distributed power supply 310 has been provided based on a first message is conceivable. Alternatively, a case of controlling a distributed power supply 310 based on a first message for a time slot in which the distributed power supply 310 is controlled based on a second message is conceivable. For example, a case of an instruction to increase or decrease an output of a distributed power supply 310 being provided based on a first message in a time slot in which an instruction to stop the distributed power supply 310 has been provided based on a second message is conceivable. In other words, a conflict between a first message and a second message includes a situation in which control performed based on a first message and control performed based on a second message cannot be implemented simultaneously or a problem can occur as a result of both being implemented simultaneously.

Here, a case where a communication protocol for a first message and a communication protocol for a second message are the same will be considered. In the embodiment, since a first message and a second message are transmitted from the predetermined server 500 to the distributed power supply system 600, if communication protocols for the first message and the second message are the same, the controller 620 may fail to distinguish between the first message and the second message. Therefore, in the embodiment, a first message is configured in such a manner as to be identifiable as a message transmitted from the power management server 200 or a second message is configured in such a manner as to be identifiable as a message transmitted from the equipment management server 400.

For example, a case where communication protocols for a first message and a second message comply with Open ADR 2.0 will be considered.

Figure 5:
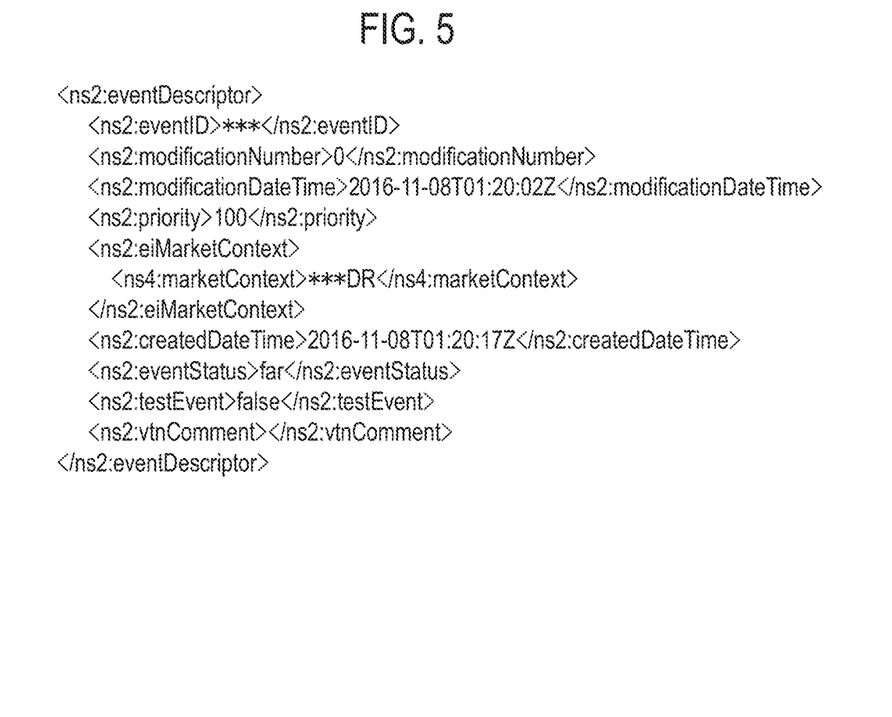
FIG. 5 is a diagram illustrating an example of a first message according to the embodiment.
Figure 6:
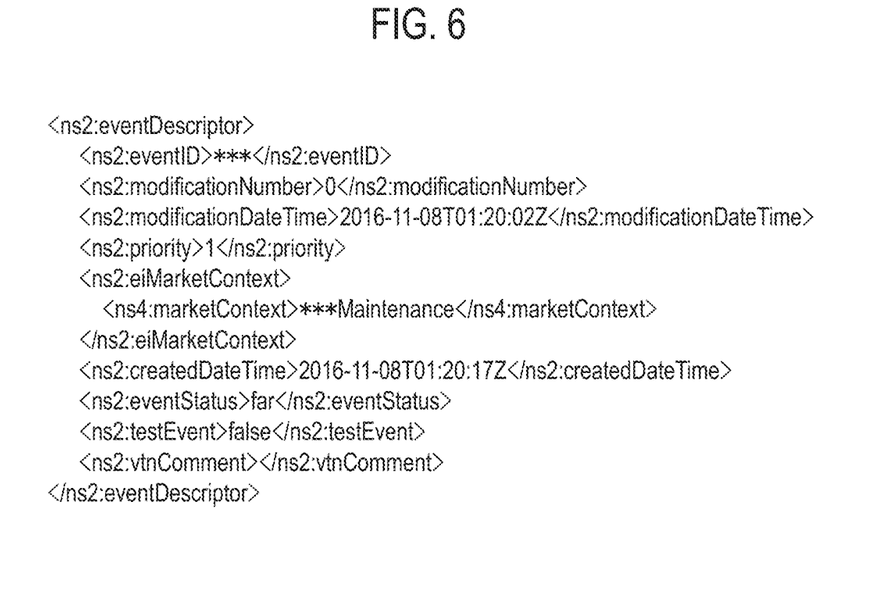
FIG. 6 is a diagram illustrating an example of a second message according to the embodiment.

Firstly, as illustrated in FIGS. 5 and 6, a first message and a second message each include an information element indicating a priority order (here, <ns2: priority>). The controller 620 determines whether a message received by the communicator 610 is one transmitted from the power management server 200 or one transmitted from the equipment management server 400, based on the priority orders. More specifically, as illustrated in FIG. 5, the priority order of the first message is "100", and as illustrated in FIG. 6, the priority order of the second message is "1". In such case, the predetermined value "1" may be determined as a priority order used only for the second message. In other words, a priority order having a value other than the predetermined value "1" may be set based on the priority order of the first message.

Secondly, as illustrated in FIGS. 5 and 6, the first message and the second message may each include an information element usable for identification of control of a distributed power supply 310 (here, <ns4: marketContext>). The controller 620 determines whether a message received by the communicator 610 is one transmitted from the power management server 200 or one transmitted from the equipment management server 400, based on a marketContext priority order. More specifically, as illustrated in FIG. 5, the marketContext in the first message is "DR" and as illustrated in FIG. 6, the marketContext in the second message is "Maintenance". In such case, it should be noted that the predetermined value "Maintenance" is a newly defined value.

Furthermore, the controller 620 may refuse acceptance of a first message until starting of a distributed power supply 310 is performed after reception of a second message that provides an instruction to stop the distributed power supply 310. In such case, if acceptance of the first message is refused, the communicator 610 may transmit a notification message indicating that control based on the first message is not performed to the power management server 200.

(Distributed Power Supply Control Method)

Figure 7:
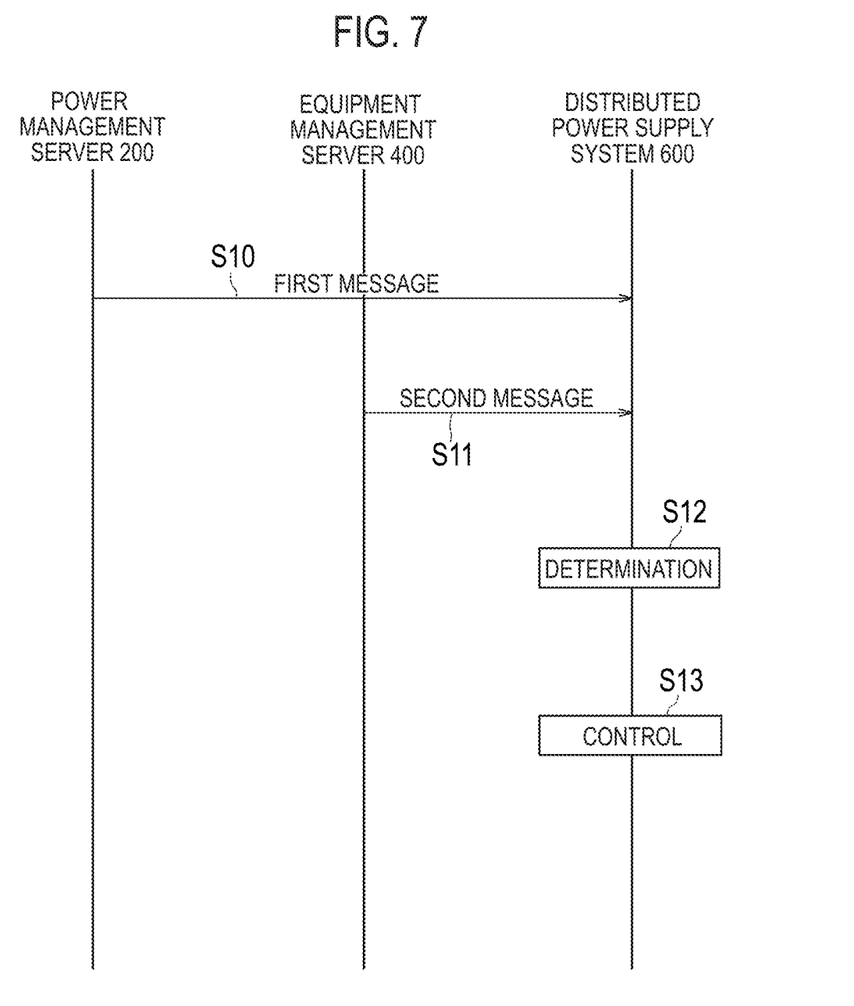
FIG. 7 is a diagram illustrating a distributed power supply control method according to the embodiment.
Figure 8:
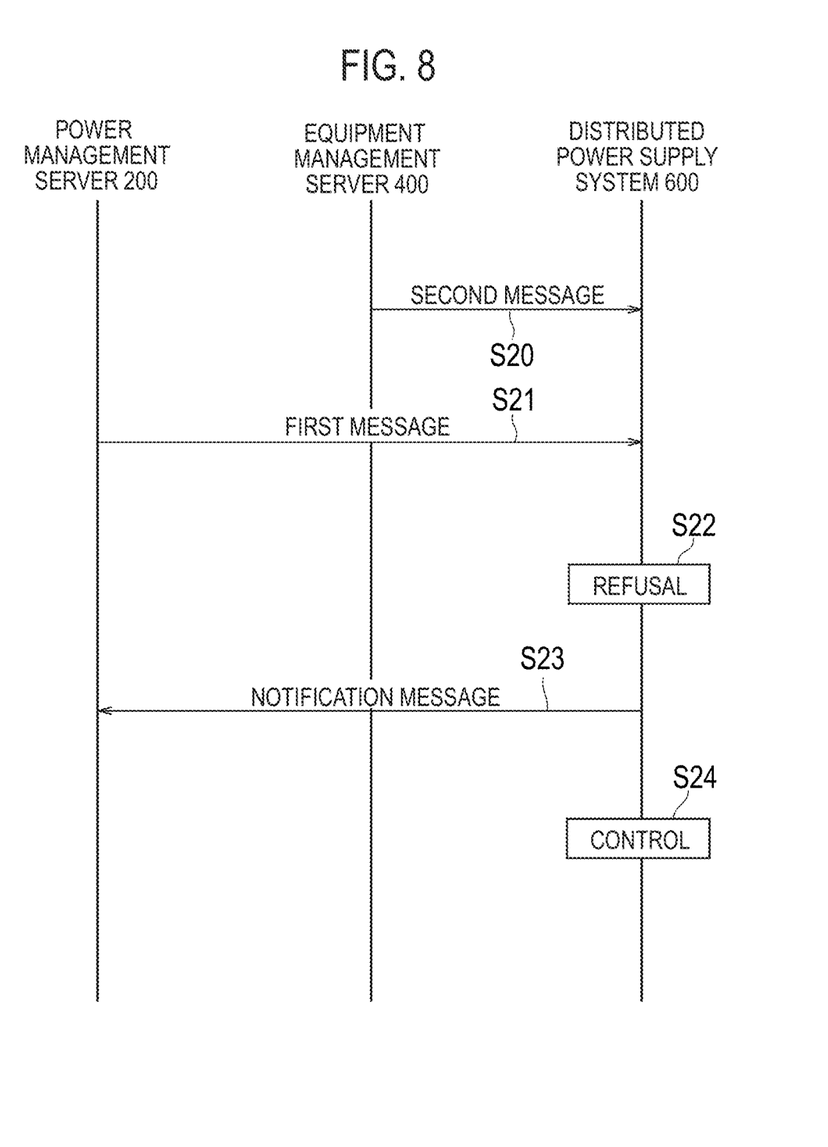
FIG. 8 is a diagram illustrating the distributed power supply control method according to the embodiment.

A distributed power supply control method according to the embodiment will be described below. In FIGS. 7 and 8, illustration of the predetermined server 500 is omitted.

Firstly, a case of controlling a distributed power supply 310 based on a second message for a time slot in which the distributed power supply 310 is controlled based on a first message will be considered.

In step S10, the power management server 200 transmits a first message to the distributed power supply system 600.

In step S11, the equipment management server 400 transmits a second message to the distributed power supply system 600.

In step S12, the distributed power supply system 600 determines whether or not the first message and the second message conflict with each other. The distributed power supply system 600 may make the determination based on the priority orders or may make the determination based on marketContext. Here, the description will be continued with regard to the case where the first message and the second message conflict with each other.

In step S13, the distributed power supply system 600 controls the relevant distributed power supply 310 based on the second message. If control of the distributed power supply 310 based on the first message has been started, the distributed power supply system 600 cancels the control based on the first message. Also, the distributed power supply system 600 may transmit a notification message indicating that control based on the first message is not performed to the power management server 200. Such processing may be omitted where the control based on the first message is the same as the control based on the second message. On the other hand, if control of the distributed power supply 310 based on the first message has not been started, the distributed power supply system 600 performs control based on the second message without performing control based on the first message.

Secondly, a case of controlling a distributed power supply 310 based on a first message for a time slot in which the distributed power supply 310 is controlled based on a second message will be considered.

In step S20, the equipment management server 400 transmits a second message to the distributed power supply system 600.

In step S21, the power management server 200 transmits a first message to the distributed power supply system 600.

In step S22, the distributed power supply system 600 refuses acceptance of the first message. For example, if the second message is a message that provides an instruction to stop the relevant distributed power supply 310, the distributed power supply system 600 may refuse acceptance of the first message until starting of the distributed power supply 310 is performed. Here, starting of the distributed power supply 310 may manually be performed by a maintenance provider or may be performed in response to reception of a second message that provides an instruction to resume operation of the distributed power supply 310.

In step S23, the distributed power supply system 600 transmits a notification message indicating that control based on the first message is not performed to the power management server 200.

In step S24, the distributed power supply system 600 controls the distributed power supply 310 based on the second message.

Operation and Effects

In the embodiment, if a first message and a second message conflict with each other, the distributed power supply system 600 controls the relevant distributed power supply 310 based on the second message preferentially over the first message. Such configuration enables properly resolving the conflict between the first message and the second message and thus enables properly controlling the distributed power supply 310.

Here, the embodiment solves a conflict between a first message and a second message based on new knowledge that maintenance should be prioritized over a power supply-demand balance. The embodiment enables, where a maintenance provider visits an installation site of a distributed power supply 310 on the premise that the distributed power supply 310 is controlled based on a second message, curbing breakup of such premise. For example, if a fuel cell apparatus that takes a long time to transition from a power generation state to a stopped state is assumed, it is possible to avoid a problem that when a maintenance provider visits an installation site of the fuel cell apparatus, the fuel cell apparatus is not stopped as scheduled.

Other Embodiments

Although the present disclosure has been described by the above-described embodiment, it should not be understood that the descriptions and the drawings that form a part of this disclosure limit the present invention. Various alternative embodiments, examples, and operation techniques will be apparent to those skilled in the art from this disclosure.

In the embodiment, a first message and a second message are transmitted to an EMS 330. However, the embodiment is not limited to this case. A first message and a second message may directly be transmitted to a distributed power supply 310. In such case, the relevant EMS 330 may function as a router or no EMS 330 may be provided.

In the embodiment, the predetermined server 500 is provided. However, the embodiment is not limited to this case. No predetermined server 500 may be provided. In such case, the power management server 200 may relay a second message or the equipment management server 400 may relay a first message. Alternatively, the power management server 200 may transmit a first message directly to the distributed power supply system 600 and the equipment management server 400 may transmit a second message directly to the distributed power supply system 600.

In the embodiment, a case where a communication protocol for a first message and a communication protocol for a second message are the same has been described; however, the embodiment is not limited to this case. A communication protocol for a first message and a communication protocol for a second message may be different from each other.

In the embodiment, the database 210 is provided in the power management server 200; however, the embodiment is not limited to this case. For example, the database 210 may be provided in a server connected to the power management server 200 via a network.

In the embodiment, the database 410 is provided in the equipment management server 400, but the embodiment is not limited to this case. For example, the database 410 may be provided in a server connected to the equipment management server 400 via a network.

In the embodiment, a case where the first protocol is a protocol that complies with Open ADR 2.0 and the second protocol is a protocol that complies with ECHONET Lite has been indicated as an example. However, the embodiment is not limited to this case. The first protocol only needs to be a protocol standardized as a protocol used for communication between the power management server 200 and the predetermined server 500, communication between the equipment management server 400 and the predetermined server 500 and communication between the predetermined server 500 and the EMSs 330. The second protocol only needs to be a protocol standardized as a protocol used in the facilities 300.

In the embodiment, the distributed power supply system 600 is described as, if a first message and a second message including a message that provides an instruction to stop operation of a distributed power supply 310 in order to start maintenance conflict with each other, controlling the distributed power supply 310 based on the second message preferentially over the first message; however, the embodiment is not limited to this case. If the second message includes a message that provides an instruction to resume operation of the distributed power supply 310 along with an end of maintenance of the distributed power supply 310, the first message and the second message may be regarded as not conflicting with each other. In this case, since maintenance of the distributed power supply 310 has already finished, the distributed power supply system 600 may control the distributed power supply 310 in such a manner as to prioritize stoppage of operation of the distributed power supply 310 for maintenance of a power supply-demand balance over resumption of operation of the distributed power supply 310 along with an end of maintenance of the distributed power supply 310. Also, in this case, the distributed power supply system 600 may transmit a notification message indicating that control based on the second message is not performed to the equipment management server 400.

The present application claims priory to Japanese Patent Application No. 2018-140935 (filed on Jul. 27, 2018), the entire disclosure of which is incorporated herein by reference.

The invention claimed is:

1. A distributed power supply system including a distributed power supply, the distributed power supply system comprising:
   a communicator configured to
      receive a first message that provides an instruction on control of the distributed power supply from a power management server configured to control the distributed power supply, and
      receive a second message for performing maintenance of the distributed power supply from an equipment management server configured to monitor the distributed power supply; and
   a controller configured to control the distributed power supply based on the first message and the second message,
   wherein in response to determining the first message and the second message conflicting with each other, the controller is configured to
      determine that the second message is preferentially over the first message based on contents or purposes of the first and second messages, and
      control the distributed power supply based on the second message preferentially over the first message.

2. The distributed power supply system according to claim 1, wherein
   a communication protocol for the first message is the same as a communication protocol for the second message, and
   the first message is identifiable as a message transmitted from the power management server, or the second message is identifiable as a message transmitted from the equipment management server.

3. The distributed power supply system according to claim 2, wherein
   each of the first message and the second message includes an information element indicating a priority order, and
   the controller is configured to determine whether a message received by the communicator is one transmitted from the power management server or one transmitted from the equipment management server, based on the priority order.

4. The distributed power supply system according to claim 1, wherein
   in response to reception of the second message that provides an instruction to stop the distributed power supply for performing the maintenance of the distributed power supply, the controller is configured to refuse acceptance of the first message until starting of the distributed power supply is performed.

5. The distributed power supply system according to claim 4, wherein
   in response to the acceptance of the first message being refused, the communicator is configured to transmit, to the power management server, a message indicating that control based on the first message is not performed.

6. The distributed power supply system according to claim 1, wherein
   the communicator is configured to receive the first message and the second message via a predetermined server connected to the power management server and the equipment management server.

7. The distributed power supply system according to claim 1, wherein the distributed power supply is a fuel cell system.

8. The distributed power supply system according to claim 1, wherein
   the first message includes a message that provides an instruction to increase or decrease an output of the distributed power supply in order to maintain a power supply-demand balance.

9. The distributed power supply system according to claim 1, wherein
   the first message includes a message that provides an instruction to stop or start operation of the distributed power supply in order to maintain a power supply-demand balance.

10. The distributed power supply system according to claim 1, wherein
    the first message includes a message that designates a time for starting stoppage of operation of the distributed power supply or a time for starting operation of the distributed power supply in order to maintain a power supply-demand balance.

11. The distributed power supply system according to claim 1, wherein
    the first message includes a message that designates a time or a duration during which maintenance of a power supply-demand balance is necessary.

12. The distributed power supply system according to claim 1, wherein
    the first message includes a message that provides notification of an end of maintenance of a power supply-demand balance.

13. The distributed power supply system according to claim 1, wherein
    the second message include a message that provides an instruction to stop operation of the distributed power supply in order to start the maintenance of the distributed power supply.

14. The distributed power supply system according to claim 1, wherein
    the second message includes a message that designates a time for starting stoppage of operation of the distributed power supply in order to start the maintenance of the distributed power supply.

15. The distributed power supply system according to claim 1, wherein
    the second message includes a message that designates a time or a duration necessary for the maintenance of the distributed power supply.

16. The distributed power supply system according to claim 1, wherein
    the second message includes a message that provides notification of an end of the maintenance of the distributed power supply.

17. The distributed power supply system according to claim 1, wherein
    the second message includes a message that provides an instruction to resume operation of the distributed power supply along with an end of the maintenance of the distributed power supply.

18. The distributed power supply system according to claim 1, wherein
    the second message includes a message that urges a return to a normal mode along with an end of the maintenance of the distributed power supply.

19. A control apparatus comprising:
    a communicator configured to receive a first message that provides an instruction on control of the distributed power supply from a power management server configured to control a distributed power supply, and receive a second message for performing maintenance of the distributed power supply from an equipment management server configured to monitor the distributed power supply; and a controller configured to control the distributed power supply based on the first message and the second message, wherein in response to determining the first message and the second message conflicting with each other, the controller is configured to determine that the second message is preferentially over the first message based on contents or purposes of the first and second messages, and control the distributed power supply based on the second message preferentially over the first message.

20. A distributed power supply control method comprising:

receiving a first message that provides an instruction on control of the distributed power supply from a power management server configured to control a distributed power supply;

receiving a second message for performing maintenance of the distributed power supply from an equipment management server configured to monitor the distributed power supply; and controlling the distributed power supply based on the first message and the second message, wherein the controlling the distributed power supply includes, in response to determining the first message and the second message conflicting with each other, determining that the second message is preferentially over the first message based on contents or purposes of the first and second messages, and controlling the distributed power supply based on the second message preferentially over the first message.

* * * * *